US005548534A

United States Patent [19]

Upp

[11] Patent Number: 5,548,534
[45] Date of Patent: Aug. 20, 1996

[54] TWO STAGE CLOCK DEJITTER CIRCUIT FOR REGENERATING AN E4 TELECOMMUNICATIONS SIGNAL FROM THE DATA COMPONENT OF AN STS-3C SIGNAL

[75] Inventor: Daniel C. Upp, Southbury, Conn.

[73] Assignee: TranSwitch Corporation, Shelton, Conn.

[21] Appl. No.: 272,259

[22] Filed: Jul. 8, 1994

[51] Int. Cl.$^6$ .................................................. H04J 3/06
[52] U.S. Cl. .................................. 364/514 R; 370/100.1; 370/101; 375/363
[58] Field of Search ....................... 364/514 A, 514 B, 364/514 C, 514 R; 370/100.1, 101; 375/363

[56] References Cited

U.S. PATENT DOCUMENTS

| | | | |
|---|---|---|---|
| 4,053,715 | 10/1977 | Drapkin | 179/15 |
| 4,159,535 | 6/1979 | Fuhrman | 364/900 |
| 4,347,620 | 8/1982 | Black et al. | 375/112 |
| 4,429,386 | 1/1984 | Graden | 370/100 |
| 4,434,498 | 2/1984 | Mathieu | 375/114 |
| 4,551,830 | 11/1985 | Huffman | 370/15 |
| 4,667,324 | 5/1987 | Graves | 370/102 |
| 4,674,088 | 6/1987 | Grover | 370/102 |
| 4,685,101 | 8/1987 | Segal et al. | 370/94 |
| 4,771,426 | 9/1988 | Rattlingourd et al. | 370/102 |
| 4,791,652 | 12/1988 | McEachern et al. | 375/111 |
| 4,833,673 | 5/1989 | Chao et al. | 370/94 |
| 4,928,275 | 5/1990 | Moore et al. | 370/102 |
| 4,964,142 | 10/1990 | Annamalai | 375/118 |
| 4,967,405 | 10/1990 | Upp et al. | 370/1 |
| 5,030,951 | 7/1991 | Eda et al. | 341/100 |
| 5,033,064 | 7/1991 | Upp | 375/118 |
| 5,040,170 | 8/1991 | Upp et al. | 359/135 |
| 5,052,025 | 9/1991 | Duff et al. | 375/118 |
| 5,067,126 | 11/1991 | Moore | 370/112 |
| 5,111,485 | 5/1992 | Serack | 375/112 |
| 5,119,406 | 6/1992 | Kramer | 375/118 |
| 5,128,939 | 7/1992 | Takatori et al. | 370/100.1 |
| 5,131,013 | 7/1992 | Choi | 375/118 |
| 5,142,529 | 8/1992 | Parruck et al. | 370/84 |
| 5,157,655 | 10/1992 | Hamlin, Jr. et al. | 370/84 |
| 5,200,982 | 4/1993 | Weeber | 375/118 |
| 5,268,935 | 12/1993 | Mediavilla et al. | 375/118 |
| 5,268,936 | 12/1993 | Bernardy | 375/118 |
| 5,285,206 | 2/1994 | Peters et al. | 341/100 |
| 5,289,507 | 2/1994 | Upp | 375/118 |

(List continued on next page.)

FOREIGN PATENT DOCUMENTS

| | | |
|---|---|---|
| 2023656 | 12/1971 | Germany. |
| 2136930 | 2/1973 | Germany. |
| 2644689 | 4/1978 | Germany. |

*Primary Examiner*—Ellis B. Ramirez
*Assistant Examiner*—Patrick J. Assouad
*Attorney, Agent, or Firm*—David P. Gordon

[57] ABSTRACT

A two stage desynchronizer is provided to receive a gapped data component of an STS-3C (STM-1) signal and provide therefrom an ungapped DS-4NA (E4) data signal. The first stage includes a data byte formation block which takes the gapped STS-3C payload data and formulates the data into bytes, a first FIFO which receives the bytes, and a first FIFO read controller which utilizes the STS-3C clock signal and causes bytes of data to be read out according to a schedule which reads bytes eight or nine times out of every ten STS-3C clock cycles. For each row (270 byte times) of the STS-3C frame, either 241 or 242 bytes are read out of the FIFO according to a slightly gapped schedule where the reading of the 242nd byte at least partially depends upon the number of stuffs in the signal and the pointer movements received. The second stage of the desynchronizer includes a second FIFO, a FIFO fullness measurement block, and a VCXO. The FIFO fullness measurement block uses the incoming slightly gapped byte clock and the ungapped DS-4NA output clock as inputs for effectively measuring the relative fullness of the second FIFO, and provides a control signal based on the relative fullness. The control signal is fed to the voltage controlled crystal oscillator (VCXO) which generates the ungapped DS-4NA or E4 clock in response thereto.

19 Claims, 4 Drawing Sheets

U.S. PATENT DOCUMENTS

| | | | |
|---|---|---|---|
| 5,291,485 | 3/1994 | Afify et al. | 370/77 |
| 5,297,180 | 3/1994 | Upp et al. | 375/112 |
| 5,311,511 | 5/1994 | Reilly et al. | 370/84 |
| 5,337,334 | 8/1994 | Molloy | 375/118 |
| 5,357,514 | 10/1994 | Yoshida | 370/102 |
| 5,390,180 | 2/1995 | Reilly | 370/84 |
| 5,402,452 | 3/1995 | Powell et al. | 375/372 |
| 5,404,380 | 4/1995 | Powell et al. | 375/363 |

NOTES—
POH—PATH OVERHEAD BYTE
R—FIXED STUFF BIT
C—STUFF CONTROL BIT
S—STUFF OPPORTUNITY BIT
I—INFORMATION (PAYLOAD) BIT
O—OVERHEAD COMMUNICATIONS CHANNEL BIT

TWO STAGE CLOCK DEJITTER CIRCUIT FOR REGENERATING AN E4 TELECOMMUNICATIONS SIGNAL FROM THE DATA COMPONENT OF AN STS-3C SIGNAL

This application relates to coassigned U.S. Pat. Nos. 5,157,655 to Hamlin and Upp, 5,033,064 to Upp, 5,289,507 to Upp, and 5,297,180 to Upp which are all hereby incorporated by reference in their entireties herein.

BACKGROUND OF THE INVENTION

1. Field of the Invention

The present invention relates to a desynchronizer for high speed telecommunication signals. The invention more particularly relates to an apparatus for generating an ungapped E4 (DS4NA) signal from the gapped data component of an STM-1 (STS-3C) payload signal.

2. State of the Art

The telecommunications network servicing the Unites States and the rest of the world is presently evolving from analog transmission to digital transmission with ever-increasing bandwidth requirements. Fiber optic cable has proved to be a valuable tool of such evolution, replacing copper cable in nearly every application from large trunks to subscriber distribution plants. Fiber optic cable is capable of carrying much more information than copper with lower attenuation.

While fiber optic cable represents the future in telecommunications, presently there remains an entire telecommunications network comprised of various cable types, served by equipment of different vintages, and run according to various coexisting transmission standards. While older standards, cables, and equipment will be eventually phased out, for the time being it is necessary that all the old and new standards, equipment, and transmission lines be as compatible as possible. For example, in a wire plant, every signal should be connectible to every other signal.- To achieve this, it is not enough to simply multiplex signals from lower to higher orders and vice-versa. In addition to a mux/demux function, signal format conversion operations must be performed before connectibility can be achieved. For instance, a DS-4NA signal cannot simply be connected to an STS-3C signal as these signals are at different rates (155.52 Mb/sec±4.6 ppm for the STS-3C signal, and 139.264 Mbit/sec±20 ppm for the DS-4NA signal) and use different multiplexing formats. Thus, a conversion from a DS-4NA or E4 signal to an STS-3C or STM-1 signal requires the addition of overhead bytes, stuff, control information, etc. which are accommodated in an increased data rate. Likewise, in recovering the DS-4NA or E4 signal from the STS-3C signal in which it is carried, the overhead bytes, stuff, control information, etc. must be stripped out of the STS-3C signal as seen in the prior art FIG. 1, thereby producing gaps in the clock of the extracted DS-4NA signal from which an ungapped slower DS-4NA signal must be regenerated.

As seen in FIG. 1, for each row of two hundred seventy bytes of an STS-3C signal, there are nine bytes of transport overhead and one byte of path overhead which are typically removed from the data signal. Of the remaining two hundred sixty bytes, and as seen in FIG. 2, there are thirteen bytes of fixed stuff (RRRRRRRR) denoted "Y" which must be removed, five bytes denoted "X" which includes a stuff control bit (C), five bits of fixed stuff (R), and two bits of overhead communications which must be removed, and one byte denoted "Z" which includes five payload bits (I), one stuff opportunity bit (S), and one fixed stuff bit (R). In the "Z" byte, either one or two bits are removed depending upon whether stuff opportunity bit S of the particular signal contains data or stuff. Knowledge of whether bit S is a stuff or a data signal is obtained from the stuff control signals C which are part of the "X" bytes. Details of the STS-3C frame format and the means used to remove the overhead, stuff, and control information from the STS-3C signal are not particularly relevant to the instant invention, but may be seen with reference to prior art documents: Bellcore TR-NWT-000253; ANSI - T1.105-1991; and ITU (formerly CCITT) Recommendation G.709. What is relevant, is that the data signal received from whatever is removing the overhead, stuff and control information of the STS-3C signal is a severely gapped data signal with a one thousand, nine hundred, thirty-four or thirty-five data bits per row at a clock rate of 155.52 Mb/sec ±4.6 ppm, and an average rate of 139.264 Mbit/sec±20 ppm. This gapped STS-3C data payload signal must be transformed into an ungapped DS-4NA signal at the 139.264 Mbit/sec±20 ppm rate.

It should be noted that in the case of a negative pointer movement, the three H3 bytes of the transport overhead of the STS-3C signal are to be used for data (i.e., a data destuff). In this case, extra data bits will be placed into the frame. The number of extra data bits placed into the frame depends upon the phase of telecommunications signal. For example, if all three bytes are data bytes, twenty-four bits of data will be added to the frame. However, if one of the bytes being placed into the H3 byte locations is an X or Y byte, only sixteen extra bits of data are added to the frame. Likewise, if one of the bytes being placed into the H3 byte locations is a "Z" byte, twenty-two or twenty-three extra bits are added. Conversely, in the case of a positive pointer movement, the three bytes after the H3 TOH bytes are used as stuff bytes, and depending upon the phase of the signal the frame will contain sixteen, twenty-two, twenty-three, or twenty-four fewer bits of data.

While the apparatus and techniques disclosed in the related patents hereto provide excellent tools for desynchronizing telecommunication signals, it will be appreciated that those apparatus and techniques primarily involve signals which are of the DS-3 type or lower speed. While generally applicable, at the higher frequencies of the STS-3C and E4 signals they do not work as well as might be desired because they require the use of an extremely high speed bit serial data path through the device.

SUMMARY OF THE INVENTION

It is therefore the object of the invention to provide an apparatus which receives the gapped data component of an STS-3C signal and provides therefrom an ungapped DS-4NA data signal.

It is another object of the invention of the invention to desynchronize an STS-3C signal without the use of a telecommunications clock which is set at a considerably higher speed than the STS-3C signal.

In accord with the object of the invention, an apparatus which receives a gapped data component of an STS-3C (STM-1) signal and provides therefrom an ungapped DS-4NA (E4) data signal is provided and broadly comprises a two stage desynchronizer, with the first stage including a data byte formation means, a first FIFO means, and a first FIFO read control means, and the second stage including a second FIFO, a second FIFO fullness measurement circuit, and a voltage controlled crystal oscillator. The function of the first stage of the desynchronizer is to take gapped data from the payload of the STS-3C signal, to formulate the data into bytes, and to read the bytes out of the first stage in a less gapped fashion. To accomplish these functions, the data byte formation means receives data from the payload of the STS-3C signal which can include bytes of zero, six, seven, or eight data bits, and formulates the data into eight bit bytes for a first FIFO means while preserving bit sequence integrity. The bytes of data are forwarded to the first FIFO means by the data byte formation means as soon as they are formulated. The first FIFO read control means, which is coupled to the FIFO means, utilizes the STS-3C clock signal and causes bytes to data to be read out of the first FIFO according to a schedule which reads bytes eight or nine times out of every ten STS-3C clock cycles. Thus, for each row (two hundred seventy byte times) of the STS-3C frame, either two hundred forty-one or two hundred forty-two bytes are read out of the FIFO according to a schedule, where the reading of the extra (242nd) byte at least partially depends upon the number of stuffs in the signal and the pointer movements received (i.e., the byte stuffs or destuffs). The FIFO read control means tracks the rate at which data is being written into the FIFO by utilizing a stuff accumulation counter means which is coupled to a pointer leak mechanism and to a stuff determination means. Each time the "Z" byte of the frame includes six bits of data, the stuff determination means causes the stuff accumulation counter means to increment. Also, each time there is a pointer increment or decrement, the pointer leak mechanism causes, over time, the stuff accumulation counter means to decrement or increment by an appropriate number of bits.

The function of the second stage of the desynchronizer is to take the slightly gapped signal being supplied by the first stage of the desynchronizer and to smooth it out to provide an ungapped DS-4NA or E4 signal. To accomplish this function, the second FIFO fullness measurement circuit uses the incoming gapped byte clock end the output byte clock of the apparatus as inputs for effectively measuring the relative fullness of the second FIFO means, and provides a control signal based on the relative fullness. The control signal is fed to the voltage controlled crystal oscillator (VCXO) which generates the output clock of the apparatus in response thereto. Thus, the bytes of data in the second FIFO means are taken out of the FIFO means as the DS-4NA or E4 signal according to the rate of the output clock.

According to preferred aspects of the invention, the measuring circuit of the second stage of the desynchronizer is substantially as disclosed in U.S. Pat. No. 5,157,655 to Hamlin and Upp and is comprised of two counters, an XOR gate, and a low pass filter. One counter of the measuring circuit (i.e. the read counter) receives the apparatus output clock as its input, while the other counter (i.e. the write counter) effectively receives the slightly gapped clock accompanying the data being read from the first stage FIFO as its input. The most significant bits (msb's) of the counters are compared by the XOR gate, and the (filtered) duty cycle of the XOR gate output effectively provides an indication of the difference between the average rates of the input and output clocks. The low pass filter effectively filters out high frequency changes in the duty cycle due to the gapped nature of the input clock, and provides the VCXO with a DC signal which will change with changes in the DC component of the duty cycle. With a change in the input DC signal to the VCXO, the VCXO changes the output clock rate. Because the output clock is fed back to one of the counters of the measuring circuit, a closed loop (i.e. feedback) system is established.

A better understanding of the invention and additional advantages and objects of the invention will become apparent to those skilled in the art upon reference to the detailed description taken in conjunction with the accompanying drawings.

DETAILED DESCRIPTION OF THE PREFERRED EMBODIMENT

Figure 3:
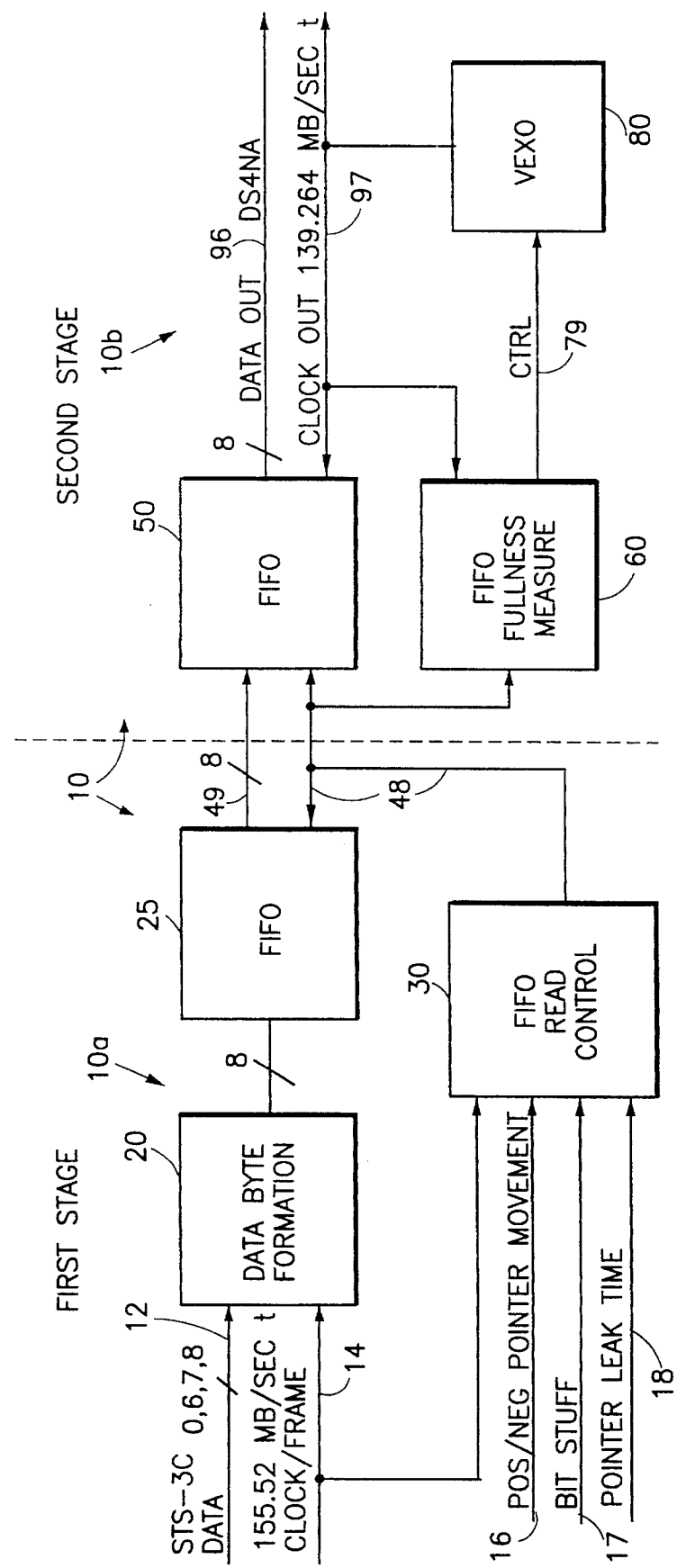
FIG. 3 is a high level block diagram of the apparatus of the invention for generating an ungapped DS-4NA signal from the data component of a gapped STS-3C payload signal.

A block diagram of the major elements of the desynchronizer apparatus of the invention is seen in FIG. 3. The desynchronizer 10 of the invention is seen to have two stages, with the first stage 10a comprising a data byte formation means 20, a FIFO 25, and a FIFO read control means 30. The second stage 10b of the desynchronizer 10 includes a second FIFO 50, a FIFO fullness measurement circuit 60, and a voltage controlled crystal oscillator (VCXO) 80. The inputs to the first stage 10a include the data component of an STS-3C (STM-1) signal 12 and the accompanying nominal 155.52 Mb/sec clock (which together with a frame clock, a payload active indication, and a payload phase indication are indicated by SONET/SDH Clock Timing 14), a pointer movement indicator 16, a bit stuff indicator 17, and a pointer leak time indicator 18. These inputs are generated by signal processing means (not shown) which may, if desired include a microprocessor (not shown). The function of the first stage 10a of the desynchronizer 10 is to take gapped data from the payload of the STS-3C signal, to formulate the data into eight bit bytes, and to read the bytes out of the first stage 10a in a less gapped fashion. To accomplish these functions, the data byte formation means 20 receives the data on data line 12 from the payload of the STS-3C signal which can include bytes of zero, six, seven, or eight data bits, and formulates the data into eight bit bytes for first FIFO 25. The bytes of data are forwarded to the first FIFO 25 by the data byte formation means 20 as soon as they are formulated; i.e., as soon as there are eight bits of data available to be formulated into a byte. As will be discussed in more detail hereinafter with reference to FIG. 4, the first FIFO read control means 30 which is coupled to the first FIFO 25, utilizes the STS-3C clock signal 12 and causes bytes of data to be read out of the first FIFO 25 according to a schedule which reads bytes eight or nine times out of every ten STS-3C clock cycles. Thus, for each row (two hundred seventy byte times) of the STS-3C frame, either two hundred forty-one or two hundred forty-two bytes are read out of the FIFO 25 by the FIFO read control means 30 according to a slightly gapped clock 48 which is on a schedule which includes the possibility of reading, in each row, an extra byte. As will be described in more detail hereinafter with reference to FIG. 4, whether an extra byte is read or not at least partially depends upon the number of stuffs in the signal as indicated by bit stuff indicator 17, and the pointer movements received as indicated by positive/ negative pointer movement indicator 16.

The function of the second stage 10b of the desynchronizer 10 is to take the slightly gapped data signal 49 being supplied by the first stage 10a of the desynchronizer and to smooth it out to provide a DS-4NA or E4 data signal 96 with an associated substantially ungapped output byte clock 97. To accomplish this function, and as described in detail hereinafter with reference to FIG. 5, the second FIFO fullness measurement circuit 60 uses the incoming gapped byte clock 48 and the output byte clock 97 of the second stage 10b as inputs for effectively measuring the relative fullness of the second FIFO means 50, and provides a control signal 79 based on the relative fullness. The control signal 79 is fed to the voltage controlled crystal oscillator (VCXO) 80 which generates the output byte clock 97 of the apparatus in response thereto. Thus, the bytes of data in the second FIFO means 50 are taken out of the FIFO means as the DS-4NA (E4) signal according to the rate of the output clock 97.

Figure 1:
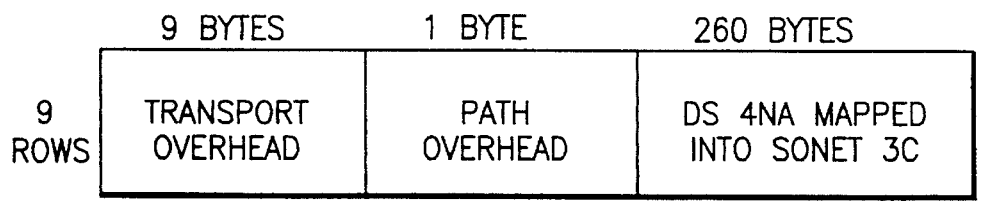
FIG. 1 is a prior art diagram showing the types of information contained in a typical STS-3C signal.
Figure 4:
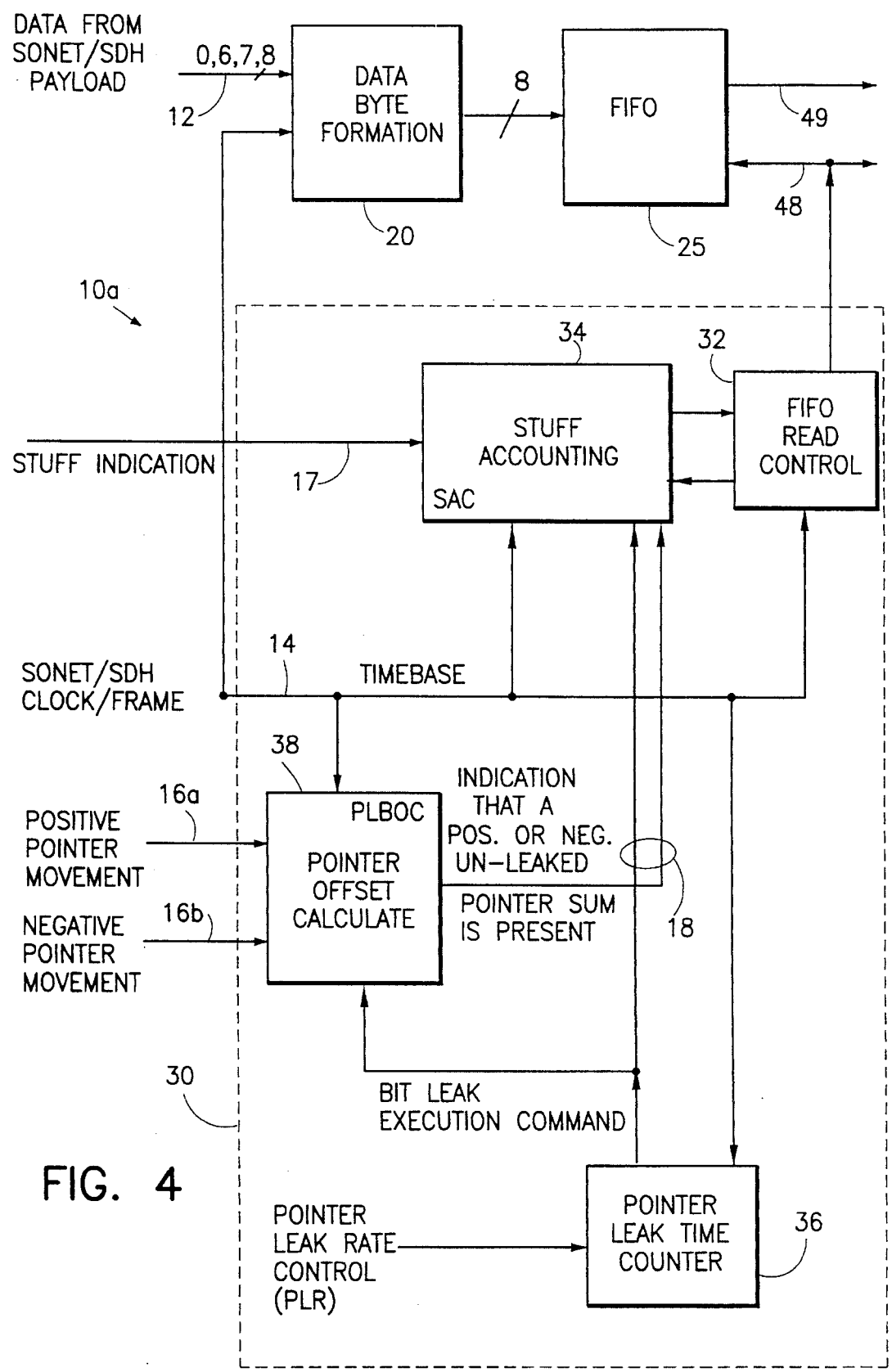
FIG. 4 is a more detailed block diagram of a preferred embodiment of the first stage of the apparatus of FIG. 3.

Turning now to FIG. 4, a more detailed block diagram is seen of the first stage 10a of the preferred desynchronizer of the invention. The data byte formation means 20 as shown is preferably embodied as a buffer which receives bits of data from data line 12. As will be appreciated, the data on data line 12 will include either zero, six, seven, or eight bits of data depending upon which byte of the STS-3C (STM-1) frame is being received. For example, transport overhead bytes and path overhead bytes (see FIG. 1) will provide no bits of data, except that the H3 byte of the path overhead might include data in the case of a pointer decrement (data destuff). While most payload envelope (SPE) bytes will contain eight bits of data, the "X" and "Y" bytes will contain no bits of data, while the "Z" byte will contain either seven bits (no stuff) or six bits (stuff) of data depending upon whether a bit stuff is occurring as indicated by the control bits C of the "X" bytes. From the inputs, whole eight-bit bytes are formed by the data byte formation means 20 while preserving bit sequence integrity, and forwarded to the FIFO 25. Thus, for example, if three bits residual are in the data byte formation means 20, and the next incoming byte contains eight bits of data, the three residual bits, and the five most significant bits of the incoming data byte are used to make a new byte for the FIFO, with the three least significant bits of the incoming byte remaining. If the next byte is a stuff opportunity byte with stuff set active and containing six information bits, five of those bits will be combined with the three current residual bits to form a byte, leaving the least significant bit as a residual to be combined with the next received byte, etc.

The reading out of bytes from the FIFO is under control of the FIFO read control means 30 which preferably includes a FIFO read controller 32, a stuff determination or accounting means (counter) 34, and a pointer leak time counter 36 and a pointer offset calculation means 38 which together comprise the pointer leak mechanism. The FIFO read controller 32 which is coupled to the SONET clock line(s) 14 causes bytes of data to be read out of the first FIFO 25 according to a schedule which reads bytes eight or nine times out of every ten STS-3C clock cycles. In particular, reading of the FIFO is preferably done on the received SONET timing clock according to the following pattern for each row of two hundred seventy byte times: read a byte out of the FIFO on nine out of ten clocks twelve consecutive times; read a byte out of the FIFO on eight of ten clocks one time; read a byte out of the FIFO nine out of ten clocks thirteen consecutive times; and read a byte out of the FIFO either eight or nine out of ten clocks one time, with the eight or nine reads depending upon a control signal received from the stuff accounting means 34. Thus, for each row of the STS-3C frame, either two hundred forty-one or two hundred forty-two bytes are read out of the FIFO 25 by the FIFO read control means 30 according to a slightly gapped clock 48 which is on a schedule which includes the possibility of reading, in each row, an extra byte. It should be appreciated that the provided schedule is designed to limit the jitter in the data signal 49 being read from the FIFO 25. Thus, preferably, the clock signals which are skipped in terms of reading out of the FIFO are preferably relatively evenly spaced in the row. For example, in the sequences of reading nine out of ten clocks, no reading might occur on the fifth of the ten clocks; while in the sequence(s) of reading eight out of ten clocks, no reading might occur on the third and eighth of the ten clocks.

Figure 2:
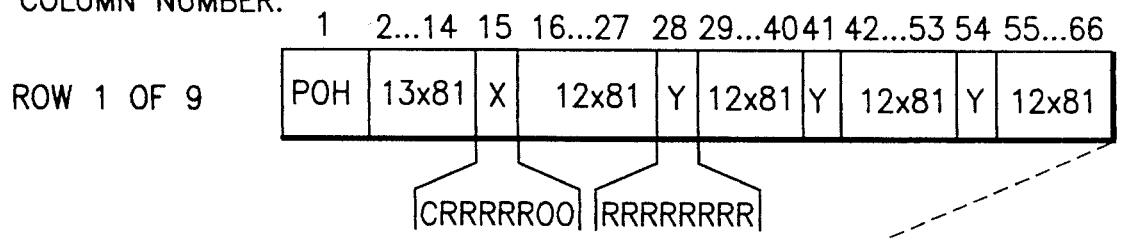
FIG. 2 is a prior art diagram showing the asynchronous mapping of one row of an STS-3C signal.
Figure 2:
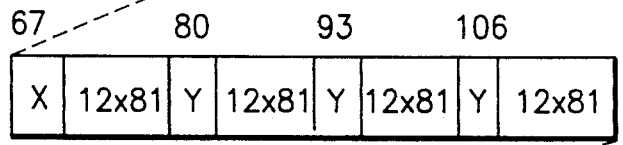
Figure 2:
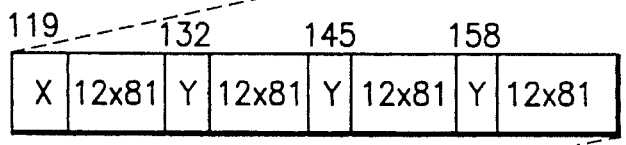
Figure 2:
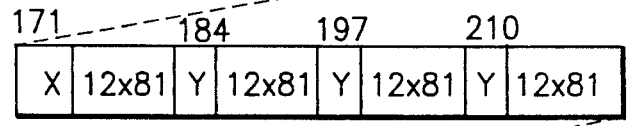
Figure 2:
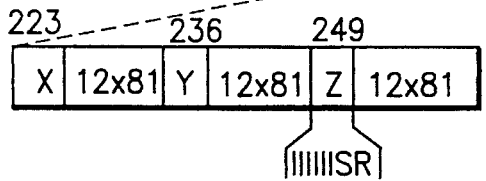

As aforementioned, whether two hundred forty-one or two hundred forty-two bytes are read out of the FIFO 25 by the FIFO read control means 30 is under control of the FIFO read controller 32. The FIFO read controller 32, in turn, makes the determination based on an indication of the stuff accumulation counter 34; i.e., whether or not eight or more bit indications have been accumulated in the stuff accumulation counter 34. There are three mechanisms in the desynchronizer which cause stuff to be accumulated or removed from the stuff accumulation counter 34. The first mechanism is based on the fact that nominally two hundred forty-two bytes will be read out of the FIFO per row. The two hundred forty-two bytes translates to 1936 bits. However, it is desired that 1935 bits be read out per row in the absence of any stuffing, since this is what the nominal frame pattern of FIG. 2 provides; i.e., the unstuffed "Z" byte contains seven data bits. Thus, to make up for this extra bit, the stuff accumulation counter 34 is incremented by the value one (i.e., a bit indication) for every received row (based on the clock 14 which is coupled to the counter 34), regardless of any received stuffing information. The second mechanism of accumulation of stuff indication bits is that the stuff accumulation counter 34 is incremented each time the bit stuff indication signal 17 indicates that the "Z" byte includes six information bits and a stuff bit as opposed to seven information bits. It should be noted that in the "H-byte" or pointer byte row (not shown), there may be zero, one or two stuff bit opportunities depending upon whether there is a positive pointer movement, no pointer movement, or a negative pointer movement. Thus, it is possible that in one of the nine rows of the frame, two stuffs might occur, and the stuff accumulation counter may be incremented twice. The third mechanism which can either increment or decrement the stuff accumulation counter relates to pointer movements in the STS-3C frame. When there is a pointer increment which results in an STS-3C byte stuff, the stuff accumulation counter is eventually incremented by sixteen, twenty-three or twenty-four bits depending on the STS-3C signal phase, while when there is a pointer decrement which results in an STS-3C byte destuff, the stuff accumulation counter is eventually decremented by sixteen, twenty-three, or twenty-four bits depending on the STS-3C signal phase as discussed in more detail below.

The accumulating or decrementing of stuff bit indications based on a pointer movement is implemented using the pointer leak time counter 36 and the pointer offset calculation means (counter) 38. During a pointer decrement, extra payload bytes will be present during the three byte times of the H3 bytes of the STS-3C signal. Depending on the phasing of the payload which is tracked by the SONET clock input 14 into the pointer offset calculation means 38, different number of data bits may be present. Thus, if all three bytes are regular data bytes, twenty-four extra data bits are present. If one of the data bytes represents a path overhead byte, only sixteen data bits are present. Likewise, if one of the bytes is an "X" byte or a "Y" byte, only sixteen data bits will be present. On the other hand, if one of the bytes is the "Z" byte, twenty-three data bits will be present in the case of a no bit stuffing situation, while twenty-two data bits will be present if there is bit stuffing. The presence of sixteen, twenty-two, twenty-three, or twenty-four data bits in the byte destuffing covers all cases, as there are no cases in which two bytes containing less than eight bits are adjacent or separated by one byte. Thus, based on the phase of the payload of the STS-3C signal, the appropriate value of sixteen, twenty-three or twenty-four is subtracted from the value in the pointer offset counter 38, with an increment being applied to the stuff accounting means 34 if a data bit stuff is present in one of the destuff bytes.

In the case of a pointer increment, a similar arrangement is followed as the three byte positions immediately following the H3 byte positions in the TOH are filled with stuff. This results in three bytes of the current row being pushed into the next row, and a corresponding deficit in the number of bits. Again, four cases are possible, with twenty-four bits being pushed into the next row if all three bytes are data bytes; sixteen bits being pushed into the next row if one byte is a path overhead, or an "X" or "Y" byte, and twenty-two or twenty-three bits being pushed into the next row if one byte is the "Z" byte. Thus, based on the phase of the payload of the STS-3C signal, the appropriate value of sixteen, twenty-three or twenty-four is added to the value in the pointer offset calculation means 38. If a "Z" byte containing a stuff bit is being pushed to the next row, the increment to the stuff accounting means 34 will occur in the next row.

As indicated above, positive or negative pointer movements as indicated in FIG. 4 by lines 16a and 16b cause an addition to or a subtraction from the value in the pointer offset calculation means. The value in the counter may go above zero or below zero. However, it is the pointer leak time counter 36 which causes the value of the pointer offset counter 38 to affect the value of the counter of the stuff accounting means 34. In particular, the excess or deficit of bits in the FIFO due to pointer movements as represented by the value in the pointer offset calculation means 38 is leaked out to the stuff accounting means 34 in isolated one-bit events as long as the count in the pointer offset calculation means 38 is nonzero. The timing of these leak-out events is derived from observations of the rate of occurrence of received pointer movements. Every time that a pointer movement occurs, it is recorded and reported to external software of a microprocessor (not shown). This software of the microprocessor time-averages the rate of the pointer movements and provides a pointer leak rate (PLR) value to the pointer leak time counter 36 which loads the PLR value therein. The pointer leak time counter 36, which is also preferably coupled to the SONET clock line(s) 14 is preferably a twelve bit down-counter which is decremented once every fourth frame. When the pointer leak time counter 36 decrements to zero, a pointer leak enable signal (PBLE) is generated, and the pointer leak time counter 36 is reset to the PLR value. The PBLE signal is used to decrement the value of the counter in the stuff accounting means 34 and the value of the counter of the pointer offset calculation means 38 if the value in the pointer offset calculation means 38 is greater than zero, or to increment the value of the counter in the stuff accounting means 34 and the value of the counter in the pointer offset calculation means 38 if the value of the counter of the pointer offset calculation means 38 is less than zero. If the value of the counter in the pointer offset calculation means 38 is zero, then the PBLE signal does not change the counter values in either the stuff accounting means 34 or the pointer offset calculation means 38.

With the counter of the stuff accounting means 34 being incremented once per row to account for the extra (1936th) bit, being incremented each time a bit stuff is indicated, and being decremented or incremented based on the pointer movements which are leaked via the pointer leak enable signal (PBLE), it will be appreciated that the value of the counter of the stuff accounting means 34 will be changing. The stuff accumulation counter preferably counts from minus one (−1) to fifteen (15). When a decision must be made whether to send out eight or nine bytes of data in the last row of the frame according to the schedule, the value of the stuff accumulation counter 34 is read by the FIFO read control 32. Preferably, if the value is eight or more, the FIFO read control 32 causes only eight bytes of data to be read during the ten clock signals. When such a determination is made, preferably, the FIFO read control 32 signals the stuff accounting means 34, and the value of the stuff accumulation counter is decremented by eight to account for the missed byte. If the value in the stuff accounting counter 34 is less than eight, the FIFO read control 32 causes nine bytes to be read during the ten clock signals, and no change is made to the stuff accumulation counter.

The output pattern of data from the first stage 10a of the desynchronizer is two hundred forty-one or two hundred forty-two bytes per row of SONET/SDH frame data. The row repetition rate is nominally 72 KHz (nine rows times the frame rate of 8 KHz), so that the primary component of the output spectrum at this point is at the 72 KHz frequency. Modulation between two hundred forty-one and two hundred forty-two bytes is at a rate of approximately every eighth row (discounting bit stuffing and pointer movement), or about 9 KHz. A change from two hundred forty-two to two hundred forty-one bytes is effectively an eight unit interval phase step in the FIFO output or into the second stage 10b of the desynchronizer. If the characteristic of the second stage is that of a single pole low pass filter with a corner frequency of 100 Hz, then the frequency of the jitter being put into the second stage will be nearly two orders of magnitude above the the corner frequency. Hence an eight unit interval input at 9 KHz will be attenuated to about 0.08 unit intervals at the output of the second stage; well within the limit of 0.4 unit interval output jitter anticipated to be required by the forthcoming International Telecommunications Union standard.

Figure 5:
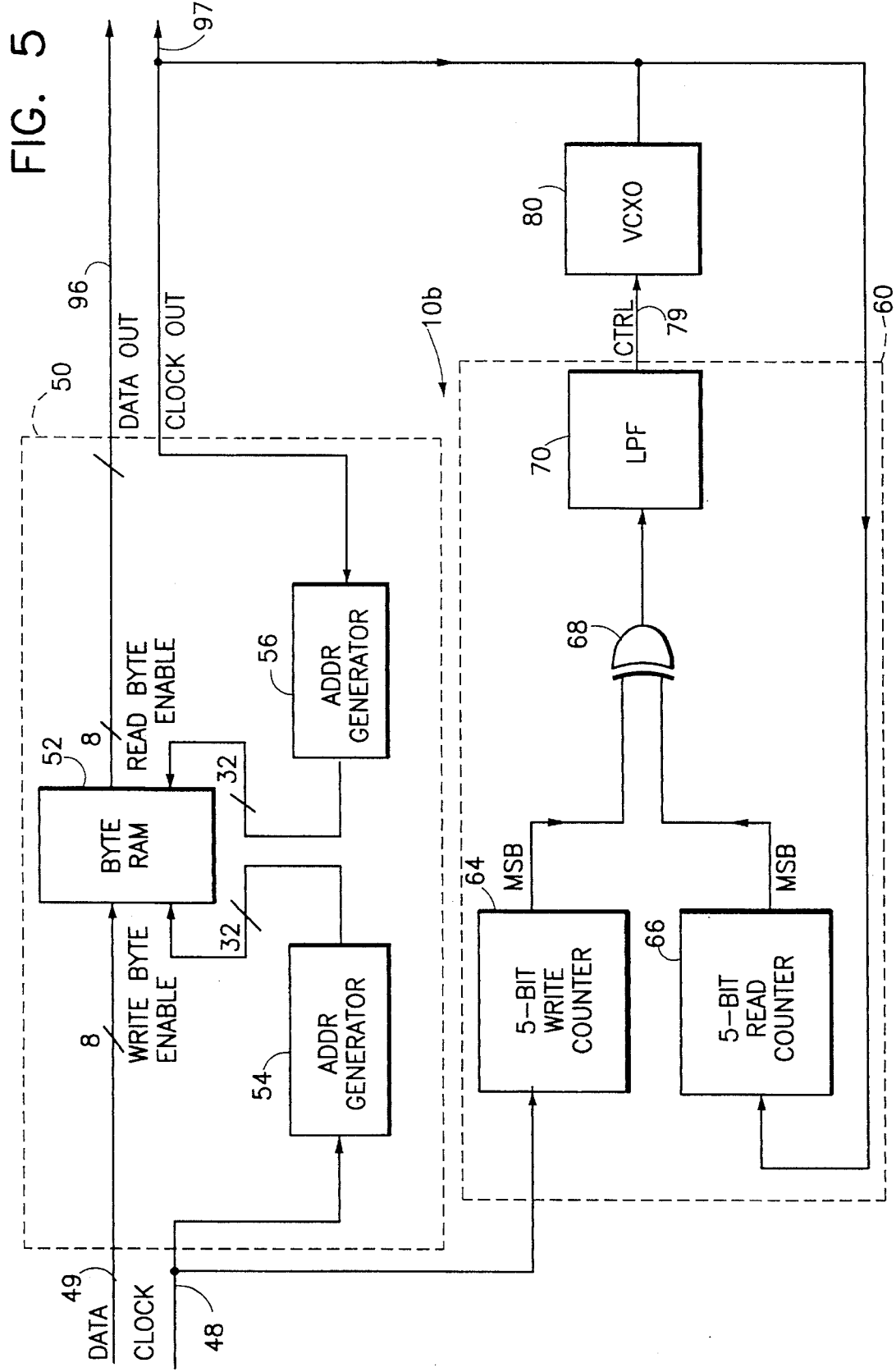
FIG. 5 is a more detailed block diagram of a preferred embodiment of the second stage of the apparatus of FIG. 3.

The second stage 10b of the preferred desynchronizer is seen in FIG. 5, and broadly includes the second FIFO means 50, a FIFO fullness measurement circuit 60, and a voltage controlled crystal oscillator 80. As indicated, the second FIFO means 50 includes a byte RAM 52 which preferably includes thirty-two bytes of storage, a write byte enable address generator 54, and a read byte enable address generator 56. As the bytes are written from the first stage 10a, the slightly jittered or gapped accompanying clock 48 causes the write byte address generator 54 to be updated. The write byte address generator.54 is preferably a recirculating thirty-two bit shift buffer having a single one value, with the remainder zeros. When the clock signal 48 is received by the write byte address generator, the write byte address generator 54 shifts its values. As a result, the next byte location in the thirty-two byte RAM 52 is enabled, and the byte of data is written to the enabled location.

The read side of the FIFO circuit 50 essentially parallels the write side, except that the byte RAM 52 receives the output clock 97 of the desynchronizer as its input, and the output clock is used as a control signal for the read side address generator 56. The read byte address generator 56 is also a thirty-two bit shift register which is preferably initialized with its "1" value sixteen bits away from the "1" value location in the write byte address generator 54; i.e. the first byte of data read from byte RAM 52 is taken from a location sixteen bytes away in byte RAM 52 from where the first byte of data is written. By separating the read and write addresses in this manner, the byte RAM 52 provides more than enough buffer for desynchronizing the evenly clocked outgoing DS4NA signal from the slightly gapped data component of the STS-3C signal which is being read from the first stage 10a of the desynchronizer.

The function of the measuring circuit 60 is to make a comparison of indications related to the slightly gapped clock signal 49 and the clock out signal 97 to effectively determine whether the FIFO means 50 (i.e. the byte RAM 52) is filling up with data, or is being depleted of data. The measuring circuit accomplishes its determination by feeding the slightly gapped clock signal 48 to a write counter 64, the output clock signal 97 to a read counter 66, feeding the msb of each counter into an XOR gate 68 and low pass filtering the output of the XOR gate 68 with a low pass filter 70. In particular, the slightly gapped clock signal 48 is used as an input to write counter 64 which effectively counts cycles of the slightly gapped write clock. Write counter 64 is preferably a five bit binary counter, although a different size counter could be utilized depending upon how quickly changes in output clock rates are desired. With a five bit binary counter, all locations in the thirty-two byte RAM 52 are specified. Thus, the change of the fifth bit indicates that the address generator 54 has gone through an entire cycle; i.e. the byte RAM has been completely rewritten with data.

The output clock signal 97 of the desynchronizer is similarly fed to a five bit binary read counter 66 which indicates that the address generator 56 has gone through an entire cycle; i.e., thirty-two bytes have been read out of the byte RAM. By taking the msb's of each of counters 64 and 66, and feeding them as inputs into the XOR gate 68, the XOR gate will provide a signal whose duty cycle relates to the relative speeds at which the byte RAM is being filled and emptied. For example, if the address generator pointers are initialized to be sixteen bytes apart, and they stay sixteen bytes apart, the output of XOR gate will be a signal which half the time is at the value one, and half the time is at a value zero. Thus, the duty cycle of the XOR output signal is fifty percent. However, if data is fed into the byte RAM faster than it is taken out, the duty cycle will increase, as the time during which the msb's are a different value will increase. The time during which the msb's are a different value will increase because the change of the msb of the write counter 64 will occur earlier than before, while the change of the msb of the read counter 66 will occur at the same time. Conversely, if the data taken out of the byte RAM is taken out faster than data is being fed into the byte RAM, the duty cycle of the XOR output signal will decrease.

Because the data signal being fed from the first stage 10a of the desynchronizer to the second stage 10b is slightly gapped, it will be appreciated by those skilled in the art that the duty cycle of particular outputs from the XOR gate will vary slightly in both directions. In order to substantially reduce the effect of these disturbances, the output from the XOR gate is fed through a low pass filter 70 which is typically comprised of a 10K resistor and a 1.0 microfarad capacitor (thus providing a corner frequency of 100 Hz). The low pass filter 70 effectively averages the duty cycle of the output of the XOR gate over a long period of time (in relative terms compared to the high rate signals being received and regenerated). The output of the low pass filter is a voltage signal which varies slightly in response to slow changes in the duty cycle of the XOR gate output; i.e. in response to the DC component of the duty cycle. For example, for a five volt system, a long term fifty percent duty cycle signal would produce a 2.5V (2.5V=(50%)5V) output. For a long term fifty-one percent duty cycle (the signal is high 51% of the time), the output voltage would be 2.55 V (2.55 V=(51%)5 V). The output voltage signal from the low pass filter is fed to the VCXO 80 which changes its clock output only slightly in response to such a change in voltage. The change in output frequency depends on the change in voltage, and the gain constant of the VCXO 80. Preferred gain constants are between 15 and 40 ppm per volt. Thus, for a VCXO having a gain constant of 25 ppm per volt, and producing a nominal frequency of 139.264 Mbit/sec, the long term change in the DC component of the duty cycle from fifty to fifty-one percent (which would be an extraordinarily large change as discussed below) would result in a frequency change of approximately 174.1 Hz: 139.264 MHz×25 ppm×0.05 V.

When the rate of the output clock is increased or decreased in response to the voltage control signal 79 sent by the low pass filter 70 to the VCXO 80, the data is taken from the byte RAM 52 accordingly, and the rate at which the five bit read counter 66 counts is also changed accordingly. Thus, a feedback loop is generated, which tends to force the duty cycle of the XOR gate 68 to an equilibrium; e.g. fifty percent. Similarly, the depth of the FIFO, i.e., the number of bytes in RAM 52, is forced toward being sixteen bytes, i.e. fifty percent full.

It should be appreciated that the equilibrium point of the duty cycle of the XOR gate signal can be changed, e.g., by changing the voltage offsets in the loop, and need not be fifty percent. For example, it might take 2.8 V instead of 2.5 V for the VCXO to output the 139.264 MHz nominal rate. In that case, in order to maintain equilibrium, the equilibrium of the system will be maintained with the fullness of the FIFO 50 at other than fifty percent. Similarly, the voltages of the system might change while running without a change in data rates. In that situation, if for example, the voltage to the VCXO 80 is increased, at first the VCXO increases its output clock rate. However, since the input data rate had not increased, the increase in the output clock rate will cause a decrease in duty cycle as data will be read from the FIFO faster than it is being placed in the FIFO. With a decreased duty cycle, the voltage to the VCXO is decreased until equilibrium is reached at a lower duty cycle and a less filled FIFO.

There has been described and illustrated herein an apparatus for generating an ungapped DS4NA (E4) signal from the data component of a gapped STS-3C payload signal. While particular embodiments of the invention have been described, it is not intended that the invention be limited thereby, as it is intended that the invention be broad in scope and that the specifications be read likewise. Thus, while a byte wide RAM was described for use as FIFO means, it will be appreciated that other types of FIFOs such as a byte parallel asynchronous FIFO could be used. Also, while an XOR gate for comparing the msb's of two binary counters was described for providing an indication of the fullness of the FIFO means, it will be appreciated that other measuring means could be utilized. For example, a comparator for comparing (subtracting) the counts of the counters could be utilized to provide an indication of fullness. Or, a comparator for comparing the address locations provided by the address generators could be utilized. It should be realized, however, that such comparators do not provide as desirable a measurement as the measurement obtained by the binary counters and XOR gate (which is filtered by the filter), as the measurement obtained with the comparator is typically both quantized in time and in amplitude. With the preferred means for measuring fullness of the FIFO, there is no amplitude quantization, as the binary counters are asynchronous, and the XOR gate provides a signal with a duty cycle which is not stepped. Also, because the measurement is continuous (due to asynchronous binary counters), the measurement is not quantized in time.

It will further be appreciated by those skilled in the art that while certain size RAMs and counters were described, and while values for the components of the low pass filter were provided, components of different sizes and values could be utilized effectively to tailor the circuit to desired parameters. In fact, different types of low pass filters could be utilized. Also, while a particular pointer leak mechanism was described where a rate control signal is provided to a pointer leak time counter, which in turn regularly generates a bit leak execution command, it will be appreciated that other pointer leak mechanisms could be utilized. For example, the microprocessor which generates the pointer leak rate control value could directly generate the pointer leak enable signal which is sent to the stuff accounting means. Likewise, the pointer offset calculations could also be conducted in the microprocessor. Thus, it will be appreciated that while specific counters and buffers are desirable in implementing the blocks of the diagrams shown, many, if not all of the functions shown in block form can be accomplished by a microprocessor. Thus, while the desynchronizer of the invention is preferably implemented in integrated circuit chip form which interfaces with a microprocessor, the different portions of the desynchronizer can be implemented in discrete components, and/or in software, and/or in the microprocessor itself. Further, it will be appreciated that instead of generating eight byte reads out of ten STS-3C clock signals when the stuff accounting means indicates that eight stuff bits have been received, the stuff accounting means can count from numbers other than minus one to fifteen, and can cause the eight byte reads out of ten instead of nine out of ten when a different number of stuff bits have been received. What is necessary, is that account be taken of the fact that fewer bytes have been read (i.e., that the counter be decremented by eight). Also, instead of scheduling the desynchronizer on a row by row basis, it will be appreciated that the two stage desynchronizer can be equivalently run on a multirow basis (e.g., four rows or eight rows scheduled together), with proper accounting for stuff bits, pointer movements, and where necessary, accounting for non-eight bit bytes. Therefore, it will be apparent to those skilled in the art that other changes and modifications may be made to the invention as described in the specification without, departing from the spirit and scope of the invention.

I claim:

1. A desynchronizing apparatus which receives a gapped payload data component of an STS-3C (STM-1) telecommunications signal with an associated STS-3C clock, the gapped payload data component having bytes with six, seven, or eight bits of signal data, and provides therefrom a substantially ungapped DS-4NA (E4) telecommunications data signal with an associated DS-4NA clock, comprising:

a) data byte formation means for receiving the bits of the gapped payload data component and for generating therefrom eight bit bytes of data;

b) first FIFO means coupled to said data byte formation means, said first FIFO means for receiving and storing said eight bit bytes of data;

c) first FIFO read control means coupled to said first FIFO means and to the STS-3C clock, said first FIFO read control means for reading said eight bit bytes of data out of said first FIFO means according to a slightly gapped clock which substantially reduces jitter in the gapped payload data component, said slightly gapped clock running on a schedule causing either two hundred forty-one or two hundred forty-two bytes to be read out of said first FIFO means for each two hundred seventy cycles of the STS-3C clock, and said first FIFO read control means for determining whether a two hundred forty-second byte is to be read out of said first FIFO means based at least partially on pointer movements in the STS-3C signal and bit stuffs in the STS-3C signal;

d) second FIFO means coupled to said first FIFO means for receiving said eight bit bytes according to said slightly gapped clock, and for storing said eight bit bytes;

e) a FIFO fullness measurement means having said slightly gapped clock as a first input, and the DS-4NA clock as a second input, said FIFO fullness measurement means for providing an indication of relative fullness of said second FIFO means; and f) a voltage controlled oscillator means coupled to said FIFO fullness measurement means for receiving said indication and for generating the DS-4NA clock signal at least partially in response thereto, wherein said eight bit bytes are clocked out of said second FIFO means at the rate of the DS-4NA clock signal, and together with the DS-4NA clock signal comprises the ungapped DS-4NA (E4) data signal.

2. A desynchronizing apparatus according to claim 1, wherein:

said first FIFO read control means includes a stuff bit counting means, a value in said stuff bit counting means being changed by one bit value each time a row of the STS-3C signal is received by the data byte formation means, and said value being changed by one bit value each time a byte of the STS-3C signal having six data bits is received by said data byte formation means.

3. A desynchronizing apparatus according to claim 2, wherein:

said first FIFO read control means includes pointer leak means for receiving an indication of a pointer movement in the STS-3C signal, and for causing said stuff bit counting means to change by one bit value a plurality of times to account for the pointer movement.

4. A desynchronizing apparatus according to claim 3, wherein:

said pointer leak means includes a pointer offset calculating means for indicating a number of unleaked bits, and a pointer leak time counter means for periodically and simultaneously causing said stuff bit counting means to change by one bit value if said number of unleaked bits is not zero and said number of unleaked bits to change by one bit value if said number of unleaked bits is not zero.

5. A desynchronizing apparatus according to claim 4, wherein:

said pointer offset calculating means changes said number by one of sixteen, twenty-three, and twenty-four bit values upon receiving an indication of a pointer movement in the STS-3C signal.

6. A desynchronizing apparatus according to claim 1, wherein:

said schedule causes said eight bit bytes of data to be read for each row of the STS-3C signal nine times out of ten STS-3C clock cycles twenty-five times, eight times out of ten STS-3C clock cycles once, and eight or nine times out of ten STS-3C clocks once.

7. A desynchronizing apparatus according to claim 6, wherein:

said schedule causes said eight bit bytes of data to be read for each row of the STS-3C signal nine times out of ten STS-3C clock cycles either twelve or thirteen times in a row, followed by eight times out of ten clock STS-3C clock cycles, followed by nine times out of ten STS-3C clock cycles the other of twelve or thirteen times in a row, followed by eight or nine times out of ten STS-3C clock cycles once.

8. A desynchronizing apparatus according to claim 3, wherein:

said plurality of times comprises one of, sixteen, twenty-three, and twenty-four times depending on a phase of the STS-3C signal.

9. A desynchronizing apparatus according to claim 2, wherein:

said first FIFO read control means causes said value in said stuff bit counting means to change by eight when two hundred forty-one bytes are read out of said first FIFO means for a row of two hundred seventy cycles of the STS-3C clock.

10. A desynchronizing apparatus according to claim 4, wherein:

said first FIFO read control means causes said value in said stuff bit counting means to change by eight when two hundred forty-one bytes are read out of said first FIFO means for a row of two hundred seventy cycles of the STS-3C clock.

11. A desynchronizing apparatus according to claim 3, wherein:

said schedule causes said eight bit bytes of data to be read for each row of the STS-3C signal nine times out of ten STS-3C clock cycles twenty-five times, eight times out of ten STS-3C clock cycles once, and eight or nine times out of ten STS-3C clocks once.

12. A desynchronizing apparatus according to claim 11, wherein:

said schedule causes said eight bit bytes of data to be read for each row of the STS-3C signal nine times out of ten STS-3C clock cycles either twelve or thirteen times in a row, followed by eight times out of ten clock STS-3C clock cycles, followed by nine times out of ten STS-3C clock cycles the other of twelve or thirteen times in a row, followed by eight or nine times out of ten STS-3C clock cycles once.

13. A desynchronizing apparatus according to claim 1, wherein:

said second FIFO means comprises a byte wide RAM, a write address generator coupled to said byte wide RAM for enabling locations in said byte wide RAM, and a read address generator coupled to said byte wide RAM for enabling locations in said byte wide RAM, said eight bit bytes of data are clocked into said byte wide RAM according to locations in said byte wide RAM enabled by said write address generator, and said eight bit bytes of data are clocked out of said byte wide RAM according to locations in said byte wide RAM enabled by said read address generator.

14. A desynchronizer apparatus according to claim 1, wherein:

said FIFO fullness measurement means is comprised of a first counter means for counting cycles of said slightly gapped clock, a second counter means for counting cycles of the DS-4NA clock, logic means coupled to said first and second counters for comparing an indication of counts of said first counter means and said second counter means, and a low pass filter coupled to said logic means and to said voltage controlled oscillator means for filtering out high frequency components of said comparison output and for providing a voltage signal to said voltage controlled oscillator, said voltage signal constituting said indication of relative fullness of said second FIFO means.

15. A two-stage desynchronizing apparatus which receives a gapped payload data component of a first telecommunications signal with an associated first clock, said first telecommunications signal having rows of bytes, the gapped payload data component having bytes with different number of bits of signal data, and provides therefrom a substantially ungapped second telecommunications data signal with an associated second clock, comprising:

a) a digital first desynchronizing stage having,
  1) data byte formation means for receiving the bits of the gapped payload data component and for generating therefrom eight bit bytes of data,
  2) first FIFO means coupled to said data byte formation means, said first FIFO means for receiving and storing said eight bit bytes of data,
  3) first FIFO read control means coupled to said first FIFO means and to the first clock, said first FIFO read control means for reading said eight bit bytes of data out of said first FIFO means according to a slightly gapped clock which substantially reduces jitter in the gapped payload data component, said slightly gapped clock running on a schedule causing either a first number of bytes or a second number of bytes equal to said first number plus one extra byte to be read out of said first FIFO means for each grouping of at least one row of said first telecommunications signal, and said first FIFO read control means for determining whether said one extra byte is to be read out of said first FIFO means based at least partially on pointer movements in the first telecommunications signal and bit stuffs in the first telecommunications signal; and b) a substantially analog second desynchronizing stage having,
  1) second FIFO means coupled to said first FIFO means for receiving said eight bit bytes according to said slightly gapped clock, and for storing said eight bit bytes,
  2) a FIFO fullness measurement means having said slightly gapped clock as a first input, and the second clock as a second input, said FIFO fullness measurement means for providing an indication of relative fullness of said second FIFO means, and
  3) analog oscillator means coupled to said FIFO fullness measurement means for receiving said indication and for generating the second clock signal at least partially in response thereto, wherein said eight bit bytes are clocked out of said second FIFO means at the rate of the second clock signal, and together with the second clock signal comprises the ungapped second data signal.

16. A two-stage desynchronizing apparatus according to claim 15, wherein:

said first FIFO read control means includes a stuff bit counting means, a value in said stuff bit counting means being changed by one bit value each time a stuff bit opportunity byte of the first telecommunications signal is received by said data byte formation means and has a stuff in a stuff bit of said stuff bit opportunity byte.

17. A two-stage desynchronizing apparatus according to claim 16, wherein:

said first FIFO read control means includes pointer leak means for receiving an indication of a pointer movement in the first telecommunications signal, and for causing said stuff bit counting means to change by one bit value a plurality of times to account for the pointer movement.

18. A two-stage desynchronizing apparatus according to claim 17, wherein:

said pointer leak means includes a pointer offset calculating means for indicating a number of unleaked bits, and a pointer leak time counter means for periodically and simultaneously causing said stuff bit counting means to change by one bit value if said number of unleaked bits is not zero and said number of unleaked bits to change by one bit value if said number of unleaked bits is not zero.

19. A two-stage desynchronizing apparatus according to claim 18, wherein:

said pointer offset calculating means changes said number by a value upon receiving an indication of a pointer movement in the first telecommunications signal, wherein said value depends upon the phase of said first telecommunications signal.

\* \* \* \* \*